(No Model.)
C. J. DUDLEY.
ELEVATOR.
No. 430,339. Patented June 17, 1890.
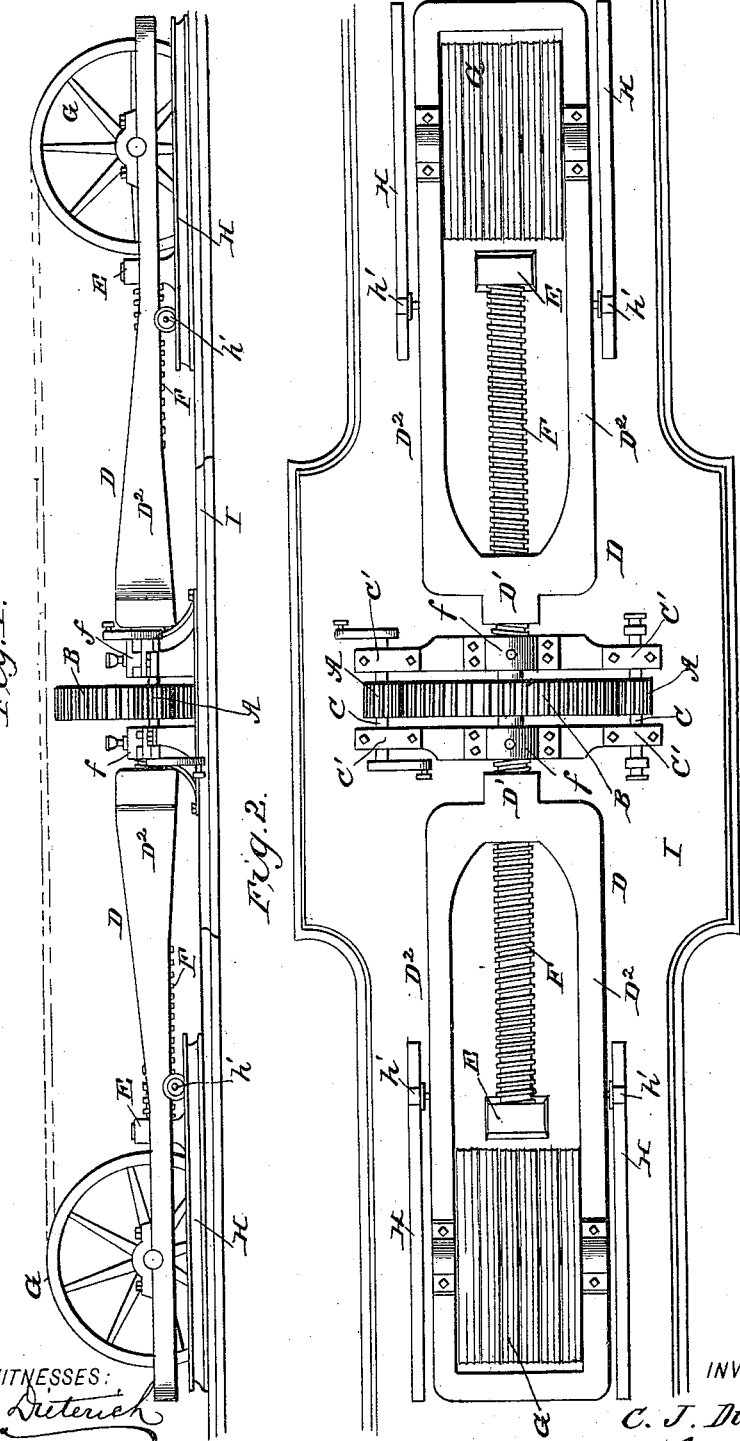
WITNESSES:
Fred G. Dieterich
P. B. Turpin.
INVENTOR:
C. J. Dudley.
BY Munn & Co
ATTORNEYS

UNITED STATES PATENT OFFICE.

CHARLES J. DUDLEY, OF MOBILE, ALABAMA.

ELEVATOR.

SPECIFICATION forming part of Letters Patent No. 430,339, dated June 17, 1890.

Application filed September 11, 1889. Serial No. 323,685. (No model.)

*To all whom it may concern:*

Be it known that I, CHARLES J. DUDLEY, of Mobile, in the county of Mobile and State of Alabama, have invented a new and useful Improvement in Elevators, of which the following is a specification.

My invention is an improvement in elevators; and it consists in certain novel constructions, combinations, and arrangements of parts, as will be hereinafter described and claimed.

In the drawings, Figure 1 is a side and Fig. 2 a top plan view of my improvement.

In carrying out my invention I provide a suitable base-plate or frame I, having near its opposite ends guide-rails H H, and provided between its ends with bearings $f$ for the screw-shaft F, and with bearings C' for the shafts C. This base-plate also has blocks or stands E, forming journal-supports for the ends of the screw-shaft F, as shown.

The pulleys or drums G are suitably journaled in supports or frames D, which frames have at D' threaded bearings for the screw-shaft F. By preference the frames D are formed, as shown, with the bearings D' at their inner ends, and with side bars $D^2$ and outer end bars $D^3$, the whole forming a frame fitting around the pulleys or drums G, the shaft of the latter being supported in the side bars of the frame. The frame D is movable on the rails H, being preferably provided with rollers $h'$, bearing on the said rails, as shown. The opposite ends of the shaft F, it will be seen, are threaded reversely—that is to say, the shaft has right-hand threads at one end and left-hand threads at the other—so that as the screw-shaft is turned it will draw both the pulley-frames in or force the same out, according to the direction in which the shaft is turned. The wire ropes being properly reeved around the drums or pulleys and connected with the elevator-car will consequently be properly operated on to lift or lower the car, as will be understood by those skilled in the art. The drive-gearing is arranged midway between the pulley-frames, as shown, such arrangement being important and advantageous, as it applies the strain to the screw at a point centrally between the points at which the screw is strained in transmitting its motion, thus giving an easier motion and operation to the parts. The arrangement, as shown, also enables a compact arrangement of the parts, as will be readily understood.

The gearing preferably consists of a gear B, keyed on the screw-shaft at the middle of the same, and shafts C, arranged at opposite sides of the wheel B, and having pinions A meshing with the wheel B, as shown.

Suitable motor mechanism may be connected with the shafts C to operate the same, as will be understood.

A piece may be extended from the frames D to prevent them from lifting up, or a sort of cross-head slide may be used.

Having thus described my invention, what I claim as new is—

1. The combination of the screw-shaft having a right-hand thread at one end and a left-hand thread at the opposite end, the pulleys or drums, the supports for said pulleys engaged by the screw on opposite sides of the center of such screw-shaft, and the driving-gear arranged midway between the opposite pulley supports or frames, substantially as set forth.

2. The combination of the main frame, the pulleys, the supports or frames for said pulleys, having near their outer ends bearings for the pulleys and provided at their inner ends in a line midway between said pulley-bearings with threaded bearings, and the screw-shaft having its opposite ends threaded with right and left hand threads and engaging the bearings of the pulley-frames, substantially as set forth.

3. The combination of the main frame having guide-rails, the screw-shaft having a right-hand thread at one end and a left-hand thread at the opposite end, the pulley-frames movable on the rails of the main frame and having threaded bearings engaged by the threads of the screw-shaft, and the driving-gear arranged between the opposite pulley-frames, substantially as and for the purposes set forth.

4. The combination, with the pulleys and the frames or supports therefor, of the screw-shaft having right and left hand threads engaging the bearings or frames of the pulleys, the gear secured on said screw-shaft between said pulley frames or supports, and the driveshafts arranged on opposite sides of said gear and having pinions engaged therewith, substantially as set forth.

5. The improvement in elevators herein described, consisting of the main frame provided with rails H H, and having between its ends suitable bearings for the screw-shaft and drive-gearing, the screw-shaft having right and left hand threads, the frames D, having at their inner ends threaded bearings engaged by the screw-shaft and provided with rollers bearing on the rails H, and the drums or pulleys journaled in said frames D, substantially as set forth.

CHARLES J. DUDLEY.

Witnesses:
JAMES H. WEBB,
PERCY FINCH.